United States Patent [19]

von Bismarck

[11] Patent Number: 4,575,990

[45] Date of Patent: Mar. 18, 1986

[54] SHRINK PACKAGING PROCESS

[75] Inventor: Gottfried von Bismarck, Lutry, Switzerland

[73] Assignee: W. R. Grace & Co., Cryovac Div., Duncan, S.C.

[21] Appl. No.: 690,789

[22] Filed: Jan. 11, 1985

[30] Foreign Application Priority Data

Jan. 19, 1982 [GB] United Kingdom ............... 8401383

[51] Int. Cl.⁴ .......................................... B65B 31/04
[52] U.S. Cl. ..................................... 53/434; 53/442; 53/469
[58] Field of Search .............. 53/403, 407, 408, 427, 53/434, 441, 442, 469, 512, 557

[56] References Cited

U.S. PATENT DOCUMENTS

| | | | |
|---|---|---|---|
| 2,768,487 | 10/1956 | Day et al. .............................. | 53/407 |
| 4,027,456 | 6/1977 | Wilson .................................. | 53/434 |
| 4,148,933 | 4/1979 | Janovtchik ....................... | 53/407 X |
| 4,164,111 | 8/1979 | Di Bernardo ........................ | 53/434 |
| 4,236,672 | 12/1980 | Koeberle ........................... | 53/407 X |
| 4,363,205 | 12/1982 | Hollander ......................... | 53/469 X |

Primary Examiner—Robert L. Spruill
Assistant Examiner—Michael D. Folkerts
Attorney, Agent, or Firm—John J. Toney; William D. Lee, Jr.; Mark B. Quatt

[57] ABSTRACT

The invention provides a process for packaging a product article such as meat, in a plastics bag (1) by injecting a hot gas, in this case steam, into the bag interior from behind the product article (2) using a nozzle (3) to flush air (at 5) from the bag (1) and to impart shrinking heat to the material forming the bag.

When using steam, or another vapor capable of condensing at atmospheric pressure above room temperature, the condensing of the vapor effects evacuation of the bag interior.

16 Claims, 7 Drawing Figures

SHRINK PACKAGING PROCESS

The present invention relates to a shrink packaging process in which an article is placed in a heat-shrinkable envelope from which air is expelled and which is then shrunk into contact with the article and sealed.

It is known that air can be excluded, for avoiding oxidative deterioration of the packed product, by flushing the pack interior with an inert gas before sealing. However, residual flushing gas in the pack after sealing prevents the attainment of a proper skin pack.

Traditionally the shink packaging of articles in plastics bags to give a true skin pack has involved the use of vacuum chambers or suction nozzles which apply suction to the interior of the bag to remove air from the bag, following which the bag is sealed and subsequently shrunk.

There have also been proposals, for example in U.S. Pat. No. 4,164,111 (Di Bernardo), for subjecting the loaded bag to shrinking heat within the vacuum chamber before sealing of the bag and this results in a sealed bag which does not need post-shrinking.

Air is perhaps not the ideal shrinking medium and it has previously been proposed, in U.S. Pat. No. 2,880,522 (Rollins), to place the closed bag in a steam chamber to impart the shrinking heat to the bag.

U.S. Pat. No. 4,081,942 (Johnson) discloses injecting steam into a filled pouch, the flush out air so that the pouch can then be sealed and can be subsequently subjected to an autoclaving operation without risk of expansion of the atmosphere within the bag to burst the bag seals. Clearly there is in that case no question of shrinking.

The object of the present invention is to provide a packaging process in which the finished pack has a pleasing appearance of the envelope tightly hugging the contours of the enclosed product article by a vacuum-shrinking technique.

Accordingly, the present invention provides a process for packaging comprising placing a product article in a heat-shrinkable plastics envelope, flushing air from the envelope interior by injecting a hot gas into the envelope interior so as to impart shrinking heat to the envelope and sealing the envelope to provide a heat-shrunk sealed at least substantially air-free package.

In order that the present invention may be readily understood the following description is given, merely by way of example, with reference to the accompanying drawing in which.

Although the preferred embodiments of the invention are described in terms of packaging in a heat-shrinkable bag, any other form of envelope may be used, for example a container formed of two superposed sheets (one of which may be a thermoformed tray). The term 'envelope' used herein should be interpreted accordingly.

Figure 1:
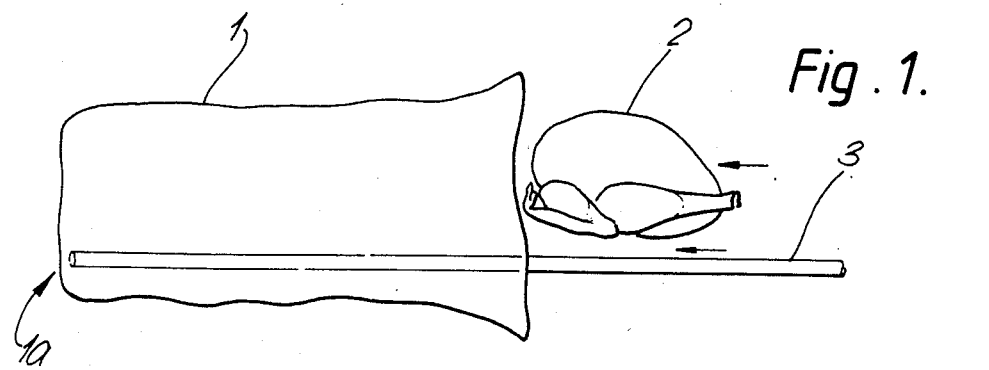
FIG. 1 shows a bag being loaded with a product article.

Referring now to the drawings, FIG. 1 shows a bag 1 into which an article 2, in this case a chicken or turkey, is being inserted. A flushing nozzle 3 has already been inserted up to the closed end 1a of the bag.

Figure 2:
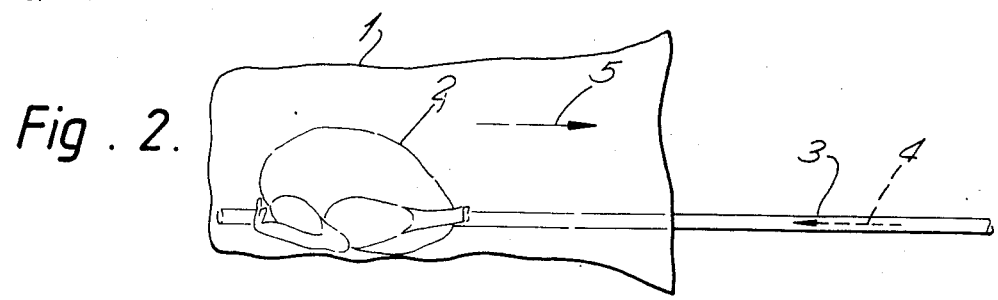
FIG. 2 shows the bag with the product article at the start of removal of air from the bag.

In FIG. 2 the configuration is shown during injection of flushing steam indicated by arrow 4 and during removal of the air and entraining flushing steam from the bag interior as represented by arrow 5.

Figure 3:
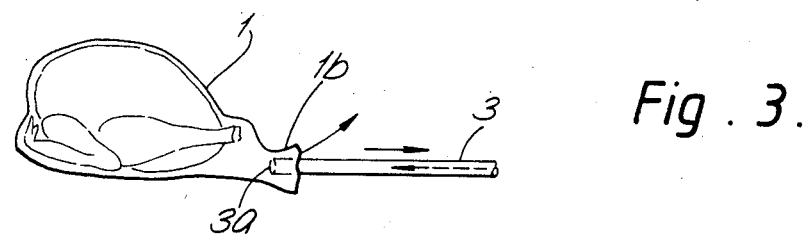
FIG. 3 shows a part-shrunk bag subsequently during the air removal process.

In the configuration shown in FIG. 3, the bag material 1 has shrunk considerably into contact with the product article 2 and furthermore the nozzle 3 has been retracted so that its discharge end 3a is close to the neck region 1b of the bag.

The progressive retraction of the flushing nozzle 3 from the closed end 1a of the bag towards the neck end 1b ensures that the part of the bag which is contacted by the hot flushing steam in the early stages is at the closed end 1a of the bag and subsequently the region of highest temperature travels towards the neck region 1b. As a result, the bag starts to shrink at the closed end first and subsequently shrinks at the neck end 1b, and the progressive travelling of the region of highest temperature results in a corresponding travel of the region of maximum peripheral shrinkage so that the progression of the shrinkage helps to expel air from the back of the product article (the left hand end of the chicken or turkey 2 in FIG. 2) towards the opposite end of the article nearer the bag neck.

Furthermore, if the operator is able to constrict the neck of the bag during the early stages of the expulsion operation this will help to balloon the bag material away from the product article 2 around the area of maximum transverse cross-section (approximately centrally of the product article 2 in FIG. 2) which will help the removal of air from behind the product article and from any cavities in the product, e.g. the interior of poultry.

Figure 4:
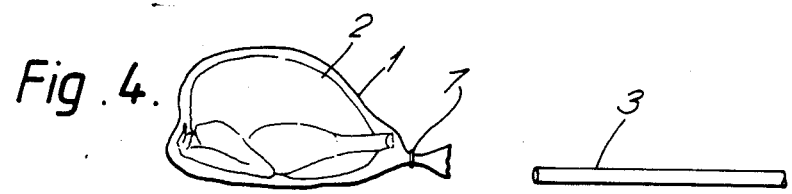
FIG. 4 shows the bag as it is being sealed upon completion of air removal.

By the time the FIG. 4 configuration has been attained, the shrinkage of the bag 1 into contact with the product article 2 is almost complete and a clip 7 is applied, by means not shown, but which are conventional in this art. At this stage the flushing nozzle 3 has been fully retracted from the bag.

Because the expulsion of air continues throughout the shrinking of the bag, by the time the clip 7 is applied to the bag neck 1b at the end of the shrinking operation there will be no air remaining within the bag but simply a small residue of the steam. After clipping of the bag, the package will soon adopt the FIG. 5 configuration in which condensation of the steam residue to form a few residual water droplets in the bag 1 will result in the FIG. 5 configuration where the bag 1 closely hugs the profile of the product article 2 due to the combined effects of both bag shrinkage and evacuation of the bag interior through condensation.

Figure 5:
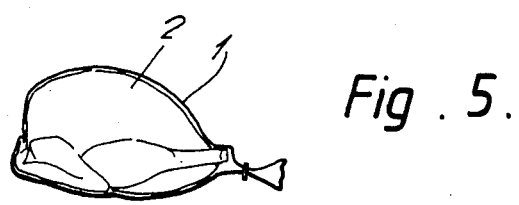
FIG. 5 is a view showing the bag subsequently when shrinkage of the bag material into contact with the product article is completed.

Although film shrinkage by flushing with a hot gas can be attained with other gaseous media apart from steam, the use of steam has particular advantages in that not only does hot steam convey heat into the interior of the bag 1 to be released by conduction as the steam contacts the inner bag wall, but also the latent heat of condensation of the steam helps to apply further heat to the bag to assist its shrinkage, and additionally the act of condensing the steam assists in generating a vacuum within the bag to cause the close-hugging configuration of FIG. 5. After temperature equilibration between the interior and exterior of the pack, the internal pressure will be the partial pressure of water vapour at the storage temperature, typically less than 1 KPa.

Other vapours apart from steam may be used, but steam is a readily available vapour which will condense at atmospheric pressure and at temperatures in the normal shrinking temperature range of currently used bags. A typical shrinkage temperature is of the order of from 65° C. to 110° C., for example around 80° C.

We envisage that the steam will be injected with some degree of superheat, in order to prevent premature condensation of the steam in the flushing nozzle 3. However, excessive superheat would run the risk of deterioration of the bag material and/or of the product article so it is also envisaged that the process of the invention will be used with wet steam.

Figure 6:
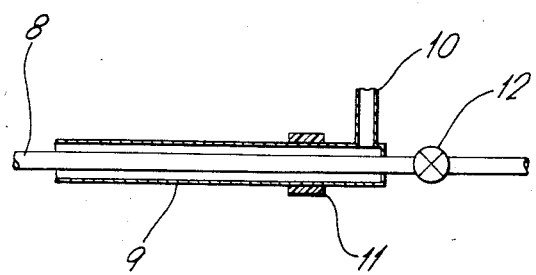
FIG. 6 shows an example of a flushing nozzle for use with the process in accordance with the present invention.

The steam nozzle shown in FIG. 6 has an inner flushing steam conduit 8 surrounded by an outer air venting conduit 9 open to atmosphere at 10. An insulated region 11 on the exterior of the air venting conduit 9 allows contact with the bag neck material and with the surrounding hand of an operator in the case of a manual machine, without hazard due to the high temperature steam within the flushing conduit 8.

The flushing steam conduit 8 is connected to a steam valve 12 which allows the flow of steam to the pipe 8 to be selectively started and stopped.

The insulating region 11 may, for example, comprise a cooling water jacket and this may, if desired, extend the full length of the air venting conduit 9.

An alternative possibility is for the conduit 9 to be dispensed with and for the exterior of the flushing steam conduit 8 to be insulated along its full length with the intention that the operator will only loosely hold the bag neck around the exterior of the flushing conduit 8 to permit escape of air during the flushing operation.

In the case of a hot flushing gas which is not of condensable vapour type, (for example the conventional nitrogen or carbon dioxide) the fact that the flushing gas is heated helps to shrink the bag as a result of the application of the flushing gas and already has the advantage of avoiding the need for an external shrink heat supply. Furthermore, there is no need for an enclosing chamber with such a process.

As indicated above, the use of a condensable vapour such as steam has the added advantage of using a greater thermal capacity and additionally effecting a much greater evacuation effect due to the fact that water has a density 1,800 times greater than that of steam, and this effect is not obtainable to the same extent where the volumetric expansion of the gas upon elevation from 0° C. to 100° C. will be much less pronounced.

The process in accordance with the present invention can be adapted for various kinds of application. For example, the operator may work on a static loading table which includes means for holding a bag which the operator then opens manually and, upon insertion of the flushing steam nozzle, maintains it open for receiving a product article. Another possibility would be for there to be a succession of flushing nozzles mounted on a conveyor belt and automatically insertable into respective packaging bags and withdrawn therefrom as the conveyor belt advances the bags and product articles which are automatically loaded into the bags along an upper run of the belt, similar to the conveyor system of U.S. Pat. No. 3,714,754 (Holcombe et al).

Various other forms of product-loading and bag-mounting mechanisms may be incorporated in the apparatus with which this process is carried out.

In its broadest aspect, the process involves flushing with a heating medium to impart shrinking heat to the bag, and the above described process with reference to FIGS. 1 to 5 illustrates currently preferred forms of that process.

Preferably the bag will be arranged such that any condensing moisture in it will run down out through the bag mouth.

Any suitable form of bag closing action may be used, including clipping or flat sealing of the mouth in face-to-face contact for example by impulse heat sealing, radio frequency heat sealing, laser radiation heat sealing, or infra red radiation heating.

The steam valve 12 is opened during the final stages of insertion of the nozzle, and will be closed shortly before clipping, i.e. when the application of shrinking heat is substantially complete. The subsequent condensing of all residual steam will release further shrink energy by relaxing the inflation tension.

The use of steam as flushing vapour has the advantage that the water condensate is compatible with the meat of the product article and will not affect the flavour of the meat.

By using a hot flushing gas including or comprising condensable vapour, the invention makes it possible to achieve at least a "soft vacuum" without the need for a heavy vacuum chamber and the energy consumption associated with repeated evacuation of the chamber. The hot flushing gas for a "soft vacuum" may be a mixture of steam and an inert gas, such as nitrogen or carbon dioxide, in any suitable ratio depending on the nature of the product. Alternatively a soft vacuum may be attained by only partial flushing of the air.

Figure 7:
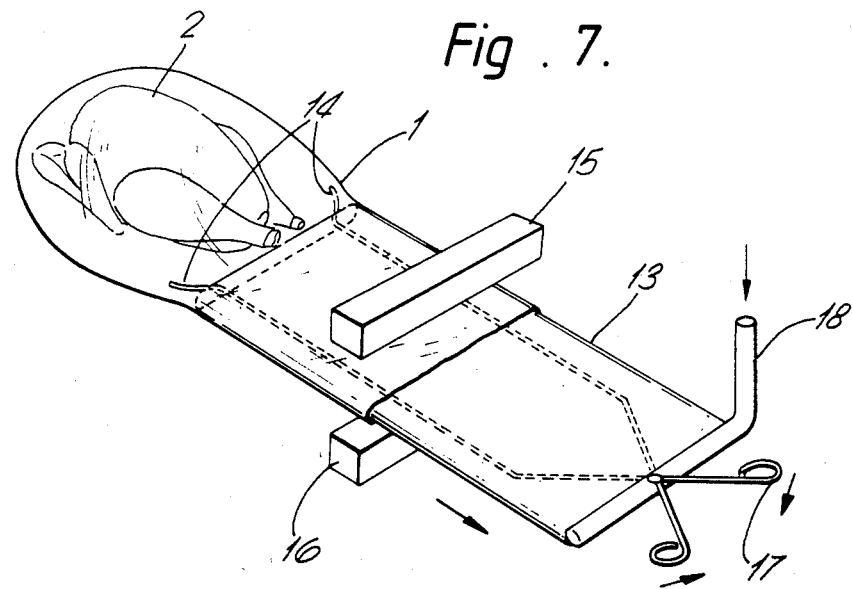
FIG. 7 shows substantially, in perspective, an alternative form of nozzle for a bag having a flat seal at the mouth.

FIG. 7 shows an alternative embodiment of nozzle 13 which is flat and is provided with spreader arm 14 to spread the mouth of the bag flat as the nozzle 13 is withdrawn, so that the bag mouth can be sealed in flat face-to-face contact by the impulse sealing bars 15, 16. The spreader arms 14 are in this case actuated manually by the handles 17, but they could be automatically actuated. The flushing steam supply line to the flat nozzle is shown at 18.

I claim:

1. A process for packaging comprising:
   (a) placing a product article in a heat shrinkable plastics bag having an opening and a closed end remote from the opening;
   (b) inserting a nozzle into the bag through the opening so that the nozzle extends approximately to the closed end;
   (c) flushing air from the bag interior by injecting a hot gas into the bag interior so as to impart shrinking heat to the bag thereby
   (d) shrinking the region of the bag in contact with the discharging hot gas;
   (e) withdrawing the nozzle to cause the regions of the bag in contact with the discharging hot flushing medium to shrink progressively as the nozzle is withdrawn as the medium contacts the bag walls; and
   (f) sealing the bag to provide a heat-shrunk, at least substantially air-free, package.

2. A process according to claim 1 wherein the neck of the bag is constricted around the nozzle after insertion of the product article, so as to allow a slight pressure buildup within the bag to achieve billowing of the bag material away from the product article at least during the early stages of flushing.

3. A process according to claim 2 wherein the nozzle has a thermally insulated exterior to allow contact of the nozzle with the bag material during flushing, without deterioration of the bag material and to allow contact of the nozzle with heat-sensitive products.

4. A process according to claim 3, wherein the thermally insulating portion of the nozzle is actively cooled by a heat transfer medium, to a temperature which is comfortable to the human hand and to heat-sensitive products.

5. A process according to claim 1 wherein the nozzle used is a double nozzle having an inlet passage for flushing gas and a vent passage for air being expelled from the bag.

6. A process according to claim 1 wherein at least some of the flushing gas is in the vapor phase at atmospheric pressure at a temperature at which the bag will be subjected to shrinking but will not be hot enough to undergo marked deterioration, and will condense to the liquid phase at a temperature above room temperature.

7. A process according to claim 6, wherein the condensation temperature of the vapour is in the shrinking temperature range of the bag so that the latent heat of condensation assists in imparting shrinking energy by heat transfer to the bag.

8. A process according to claim 7, wherein the vapor is steam.

9. A process according to claim 8, wherein the steam is in the form of wet steam on injection into the bag.

10. A process according to claim 8, wherein the steam is generated in superheated form and is hot enough not to undergo appreciable condensation until it has reached the interior of the bag.

11. A process according to claim 8 wherein the hot flushing gas is a mixture of steam with an inert gas.

12. A process according to claim 11, wherein the inert gas is nitrogen or carbon dioxide.

13. A process according to claim 1 wherein the product article is of meat or other perishable food products requiring air-free packaging for prolonged shelf life.

14. A process according to claim 1 wherein the bag is closed once all air has been flushed from the envelope interior.

15. A process according to claim 14, wherein the bag is closed by clipping.

16. A process according to claim 14, wherein the bag has a mouth which is spread during the flushing operation and then closed by sealing in face-to-face contact.

* * * * *